United States Patent [19]

Mulvany et al.

[11] 4,285,018

[45] Aug. 18, 1981

[54] DISK FILE

[75] Inventors: Richard B. Mulvany, Winchester, England; Tulsidas R. Patel, Bell Canyon, Calif.

[73] Assignee: International Business Machines Corporation, Armonk, N.Y.

[21] Appl. No.: 6,404

[22] Filed: Jan. 25, 1979

[51] Int. Cl.[3] .................... G11B 5/48; G11B 23/02
[52] U.S. Cl. ................................ 360/98; 360/78; 360/133; 360/106
[58] Field of Search .................... 360/97–99, 360/137, 106, 133, 135, 78; 310/13

[56] References Cited

U.S. PATENT DOCUMENTS

| 3,723,980 | 3/1973 | Gabor | 360/98 |
|---|---|---|---|
| 3,740,735 | 6/1973 | Gabor | 360/97 |
| 3,825,951 | 7/1974 | Katsumori et al. | 360/133 X |
| 3,838,455 | 9/1974 | Barnard | 360/78 |
| 3,886,595 | 5/1975 | Swain et al. | 360/98 X |
| 3,912,278 | 10/1975 | Teutsch | 360/97 X |
| 3,938,192 | 2/1976 | Caletti | 360/133 |
| 3,973,273 | 8/1976 | Lissner et al. | 360/133 X |
| 3,981,025 | 9/1976 | Schoettle | 360/133 X |
| 4,034,411 | 7/1977 | Kraemer et al. | 360/133 X |
| 4,092,687 | 5/1978 | Butsch | 360/97 X |
| 4,130,845 | 12/1978 | Kulma | 360/133 X |
| 4,166,284 | 8/1979 | Daniels | 310/13 |

*Primary Examiner*—John H. Wolff
*Attorney, Agent, or Firm*—R. E. Cummins

[57] ABSTRACT

A disk file for storing data is disclosed which comprises two major separable assemblies, an HDA assembly and a disk drive assembly. The HDA assembly is characterized by two separate carriage units each of which function to position a plurality of magnetic transducers in transducing relationship with a different group of magnetic disks which are mounted on a common horizontally disposed disk spindle.

The disk drive assembly is characterized by an integral baseplate whose front section is generally U-shaped in cross-sections permitting the lower portion of the HDA assembly which surrounds the magnetic disks to be positioned within the opening defined by the opposed surfaces of the U-shaped front portion. The front portion is open to accommodate the positioning of the HDA assembly on the drive assembly by a horizontal loading motion.

The drive portion of the baseplate is provided with a horizontally disposed shelf portion to which the magnetic structure of a voice coil motor is mounted. The annular flux gaps of the voice coil motor are positioned to receive voice coils which may be permanently associated with the carriage units of the HDA.

The drive assembly further includes a motor which is disposed beneath the horizontal shelf portion and which may be coupled to drive the spindle of the HDA assembly. Additionally, an air supply system including a blower which is connected directly to the spindle motor shaft is provided to supply contaminant free air to the HDA assembly.

2 Claims, 9 Drawing Figures

DISK FILE

TECHNICAL FIELD

This invention relates to magnetic disk storage devices of the type which comprise two major assemblies, a head disk assembly (HDA) and a drive assembly which together form a magnetic disk file for the storage of data in a data processing system. The head disk assembly is arranged relative to the drive assembly so that it may be replaced in the field without disruption to the remaining disk storage devices which are connected to the data processing system.

An HDA generally includes components such as the magnetic disks, the magnetic heads, and the carriage means for guiding the heads relative to the disks as they are moved radially relative to the concentric recording tracks on the disk surfaces. An HDA differs from a disk pack in that a disk pack generally includes only the magnetic disks.

The drive assembly for an HDA generally comprises a base casting which is supported on a frame member and on which the relatively heavy magnet structure of the voice coil motor is mounted. The baseplate also supports the HDA assembly and references the HDA to the drive assembly. The magnetic head carriage assembly of the HDA is coupled to the voice coil motor which is attached to the drive so that the heads can be accurately positioned relative to the recording tracks on the disks. The drive portion for an HDA type file further includes a suitable motor which may be coupled by means of a belt to provide rotation of the disks in the HDA, in addition to a system for supplying contaminant free air to the HDA to stabilize the temperature of the various critical components within the HDA.

BACKGROUND ART

A disk file of the HDA type employing two major assemblies, that is, a head disk assembly and a drive assembly, is shown in U.S. Pat. No. 4,034,411. In addition, disk files employing teachings of the abovereferenced patent, currently being marketed by several companies, are the IBM 3350 type disk file, the Storage Technology 8350 type disk file, and the Memorex 3650 type disk file.

In these files the HDA is arranged with the disks in a horizontal plane so that the disk spindle is vertical. The HDA is positioned on a substantially horizontal baseplate with the disk spindle extending above the baseplate. The baseplate is provided with suitable reference surfaces for the HDA to insure that the axis of the voice coil is coaxial with the annular flux gap of the VCM, which is also attached to the baseplate.

The above type disk files employing HDAs are characterized primarily by the magnetic transducers being permanently associated with corresponding disk surfaces, as distinguished from earlier files employing removable disk packs. In these earlier files, the disk packs merely consisted of a stack of magnetic disks and the magnetic head carriage assembly and the actuator were permanently associated with the drive portion of the file.

The need to increase track densities and to decrease the flying height of the head relative to the disk surface imposed severe tolerance limitations on both the heads and the disk when they were not permanently associated with each other, as in the case of the earlier disk pack-disk drive configuration. To avoid the manufacturing costs which these severe tolerances would impose on a disk pack-disk drive configuration, the prior art suggested the construction of a Data Module where the magnetic heads and the carriage were permanently associated with the disks. A Data Module of this type and its associated disk drive structure is shown in U.S. Pat. No. 3,973,273 (Lissner et al) assigned to the assignee of the present invention. As shown in the Lissner et al patent, the coil of the voice coil motor, which functions to position the magnetic heads to an addressed data track, is permanently associated with the voice coil motor of the drive, and means are provided to automatically couple an extension from the coil to the head carriage assembly when the Data Module is placed on the drive. The Data Module and its associated drive are constructed such that the replacement of the Data Module can be readily accomplished by an unskilled operator, which permits the user to maintain a substantial amount of data offline and, when a particular set of data is required, merely to place that Data Module into the system, much like the use of prior art disk packs.

The cost of maintaining data online, measured in terms of cost per byte, of course decreases as the track density and linear recording density of a disk increases. This decrease in storage cost per byte, plus increase in the ability of a given data processing system to handle data more rapidly and economically, plus the desire by users to add new applications to the data processing system, has encouraged users and system designers to keep more data online, as distinguished from the prior practice of loading offline data into the system via disk pack and data modules. As a result, the prior art has suggested the HDA-drive configuration represented by U.S. Pat. No. 4,034,411, previously referred to.

The HDA, as described therein, is constructed such that the coil of the VCM is permanently associated with the HDA, and apparatus which was on the drive to assist the operator in automatically loading the Data Module has been eliminated from the drive portion of the combination. In such an arrangement, the HDA is still replaceable and the design intent is to make the HDA field replaceable by a service engineer, rather than an operator. An added advantage of such an arrangement is obtained in manufacturing such a file since the HDA assembly contains substantially all of the close tolerance mechanical parts of the file and is generally manufactured in a "clean room" type of environment. The remaining portion of the drive, on the other hand, involves components which can be assembled in more conventional type electronic assembly environments.

While the volume of data stored on a disk file is an important consideration from a data processing system standpoint, another significant consideration is the time it takes to access such data. Access time generally comprises the period it takes the voice coil motor or actuator to perform a seek operation, that is, to move a magnetic head from the current track or cylinder to a new track or cylinder, plus the rotational delay for a particular record located on the recording track to be rotated under the head once the head is positioned over the new track.

Seek times are on the order of 20 to 30 milliseconds in present commercial files, which is still relatively long compared to the time it takes the file to read or write a given record. As a result, from a system standpoint where several different records on different tracks or cylinders are required in sequence, a substantial amount of time is consumed by the seek operations. The system performance can generally be improved if two separate actuators could be provided, each having access to half the amount of data since the seek operations can then be overlapped, thereby reducing the waiting time for the data processing system to the data required to perform its operation.

In some data processing applications, the only available option for a user, where system throughout is limited by seek times, is to add additional files, since that is the only available manner to obtain additional access operations at the current level of access times and magnetic recording densities. This involves more cost for storage and requires more physical space to house the installation.

The prior art has suggested fixed disk multi-actuator files for overlapping access operations to contiguous data sets on the same disk or to the same data sets. Such a configuration is represented by U.S. Pat. No. 3,025,710. However, the configuration of these fixed disk files are such that the replacement of the magnetic disks is not contemplated without a complete dismantling of the file as distinguished from a configuration which employs two separate major assemblies such as the HDA and drive assembly.

The present invention avoids the above-described dismantling problem by providing a compact HDA-drive configuration in which the HDA employs two separate independently operated head carriage assemblies, each of which is associated with a different set of disks and are moved independently of each other by the actuator which is mounted on the drive assembly of the file. The disks are mounted on a common shaft and disposed vertically in the HDA. The use of two separate actuators to access data on a given number of disk surfaces allows the track density of each set of disk surfaces to be increased because smaller carriages can be employed which permits more precise control of the head-arm assemblies associated with each carriage.

The drive portion comprises a baseplate having a generally U-shaped cross-section in the front portion so as to accommodate the lower portion of the HDA, which surrounds the bottom half of the vertically arranged disks. The U-shaped front portion is open to accommodate the lower section of the HDA as it is inserted into the drive in the horizontal direction. The upper edges of the front portion of the U-shaped baseplate are designed to provide means for referencing the HDA to the actuator structure which is mounted on an integral rear platform of the baseplate, thereby allowing the spindle drive motor to be mounted under the flat rear portion of the baseplate which mounts the actuator. The bottom of the U-shaped front portion extends generally upward to the leading edge of the rear platform to provide adequate space for the spindle motor, and to provide additional strength to the baseplate. The motor is pivotally mounted to the bottom of the rear platform of the baseplate with its axis parallel to the disk spindle. The motor is coupled to the disk spindle by means of a pair of pulleys and a drive belt which lie in a plane perpendicular to the disk spindle and motor shaft. The opposite side of the motor shaft drives the blower for the air supply system. The components of the air supply system, such as the absolute filter and ducting from the filter to the HDA, are packaged below the baseplate. The relative replacement of all of the above components contributes to a small, compact disk file arrangement.

The carriages of the HDA are positioned so that the transducers move along a pair of parallel axes which extend normal to the disk shaft and lie in a plane substantially parallel to the referencing plane established by the upper edges of the U-shaped baseplate. The carriages are positioned between the disk spindle axis and the actuator of the drive, which permits the HDA to be loaded into its operating position by movement of the HDA in a horizontal direction parallel to these axes. Such an arrangement permits the HDA to be operatively positioned on the drive by adjusting only a minimum number of components on the drive assembly, such as the electrical connections to the HDA and the drive belt.

It is, therefore, an object of the present invention to provide a compact disk file of the HDA-drive configuration type in which the HDA is provided with two head carriage assemblies which are operated independently from the drive and access different disks mounted on a common shaft.

A further object of the present invention is to provide a compact disk file of the HDA-drive configuration type in which the drive assembly is characterized by a U-shaped baseplate for supporting the HDA with the bottom half of the HDA which surrounds the vertical disks disposed within the U-shaped baseplate.

A still further object of the present invention is to provide a compact disk file comprising vertical disks and two separate head accessing carriages mounted in an HDA which is referenced to a U-shaped baseplate of the drive assembly wherein the spindle drive motor is mounted with its axis parallel to the disk spindle, beneath the magnet structure of the voice coil motor, and in which the blower for the air supply system to the HDA is mounted to the shaft of the spindle drive motor.

Another object of the present invention is to provide a dual carriage HDA assembly in which the carriages move independently along spaced parallel paths extending normal to the disk spindle and are disposed on the same side of the spindle.

DESCRIPTION OF THE INVENTION

Figure 1:
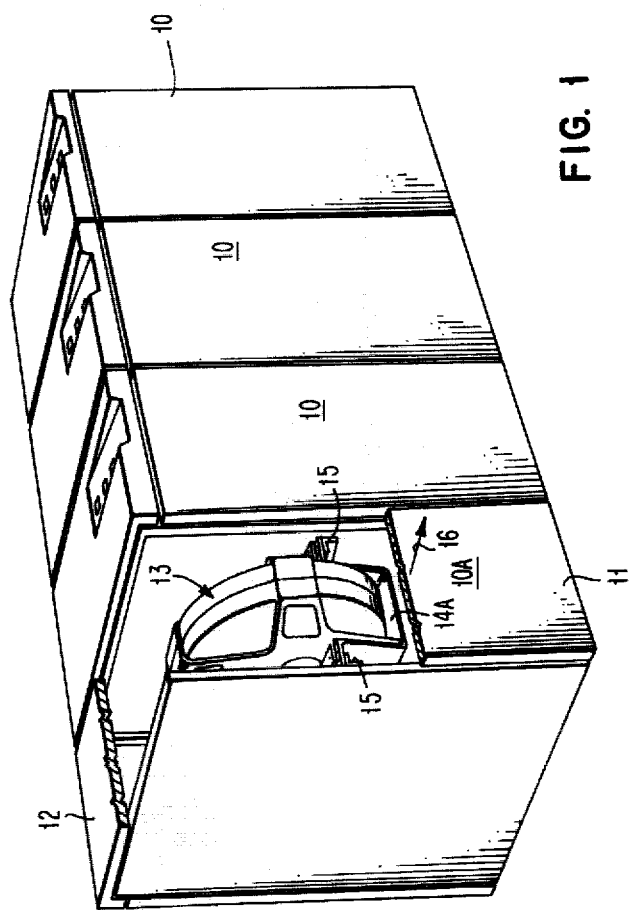
FIG. 1 illustrates an overall view of a group of disk files embodying the present invention.

FIG. 1 illustrates a string of four disk drives 10, each of which embody the present invention. As shown in FIG. 1, the front cover 11 and top 12 of disk drive 10A have been broken away to show the HDA 13 and the front portion 14A of the U-shaped baseplate. The baseplate is attached by means of shock mount 17 to suitable frame members 15 which extend around the perimeter of the baseplate and to which the covers of the machine are attached.

As shown in FIG. 1, the HDA 13 is removed from file 10A by sliding the HDA 13 relative to the front portion 14A of the baseplate in a horizontal plane in a direction normal to the front cover, as indicated by arrow 16.

Figure 2:
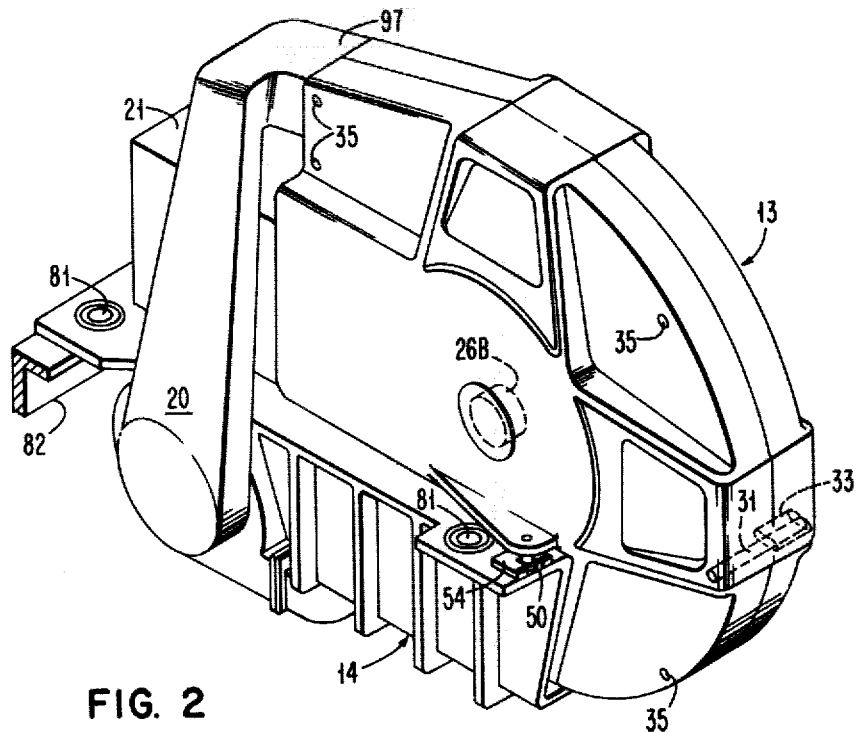
FIG. 2 is a perspective view illustrating the HDA and disk drive arrangement for one of the disk files shown in FIG. 1.
Figure 3:
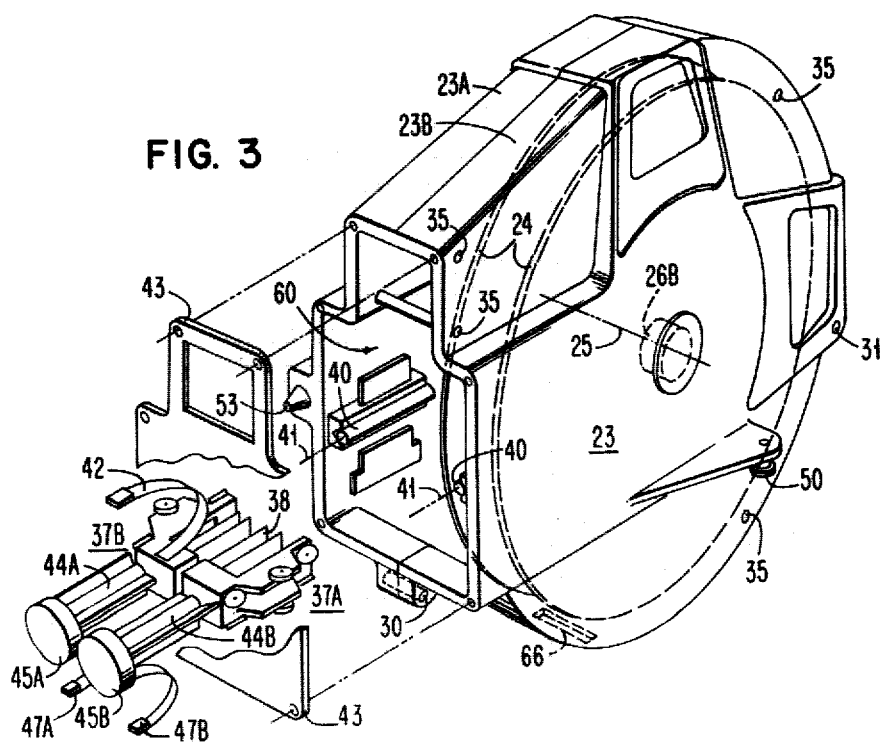
FIG. 3 is a perspective view of the two-part HDA assembly shown in FIG. 2 illustrating the position of the two carriage and way assemblies.

FIG. 2 illustrates in greater detail the major components of the disk file shown in FIG. 1. As shown in FIG. 2, the drive comprises the HDA assembly 13 and the U-shaped baseplate 14, along with the components of the air supply system 20 and the voice coil motor 21. The components of the HDA 13 and their arrangement will first be described in connection with FIGS. 2 through 4B. As shown in these figures, the HDA comprises generally a frame member 23 which, in the preferred embodiment, consists of two portions 23A and 23B which substantially surround a plurality of magnetic disks 24, the outlines of two disks being shown in dotted line form. The disks are mounted in spaced relationship on a disk spindle (not shown) whose axis 25 extends in a substantially horizontal plane. Each frame portion 23A and 23B is provided with a disk spindle bearing to support the disk spindle shaft. Only one bearing, 26B, is shown in FIGS. 2 and 3. The other bearing, 26A (not shown), is positioned correspondingly in frame member 23A.

The frame members 23A and 23B may be assembled in a suitable fixture which insures that the disk spindle axis 25 is normal to the bearings 26A and 26B in both halves of the HDA frame. Alternatively, in the assembly operation, a pair of dowl pins 30 and 31 may be employed to maintain the accurately machined frame in position relative to each other. Dowl pin 30 at the bottom of the HDA (FIG. 3) and dowl pin 31 (shown in FIG. 2) align both halves 26A and 26B of the HDA together. A dowl pin slot 33 (FIG. 2) associated with dowl pin 31 provides a degree of movement between the two halves to facilitate insertion of the dowl pins. Once the frame members 26A and 26B are suitably aligned with the disk spindle axis, the two frame members are clamped together by suitable means, such as bolts 35.

As shown in FIG. 3, the HDA further includes a pair of transducer carriage and way assemblies 37A and 37B which are shown removed from the HDA to expose the way portions of the assembly. The carriage and way assemblies 37A and 37B shown are similar to that described in U.S. Pat. No. 3,838,455, and may be employed in the present arrangement to achieve the function of positioning different sets of magnetic transducers relative to different sets of disks 24 on the spindle shaft.

The round way portion 40 of each carriage assembly is attached to its respective frame member 13 such that the axis 41 of the way lies in a plane common to the axis 25 of the disk spindle shaft and is normal to the shaft axis 25. The axes 41 of the round ways are, therefore, parallel to each other and function to cause the respective carriages 37 to move along parallel spaced paths. The carriages 37, as shown, are each L-shaped and, as described in U.S. Pat. No. 3,838,455, carry a group of arm assemblies, each of which includes a pair of transducers 38 for cooperating with one surface of one magnetic disk 24. Attached to the side of each L-shaped carriage opposite to the head-arms is an extension 44 for attaching an annular coil 45 which is adapted to be inserted in a corresponding annular flux gap of the voice coil actuator, which is mounted on a platform of the U-shaped baseplate and which will be described in detail later in the specification.

The HDA 13 is further provided with suitable means for referencing the HDA assembly to the drive assembly so that the coils 45A and 45B relate in an operative manner with the magnetic structure which is permanently attached to the drive assembly.

The referencing means, as shown, comprises a pair of feet 50 and 51 (not shown) and a locator pin 53 which cooperates with a reference guide 54 and reference cone 55 (FIG. 5) on the drive assembly. The function of these reference feet and guide is similar to the function of the guide shown in FIGS. 2 and 2A of U.S. Pat. No. 4,034,411. The function of the locator pin 53 and the reference cone 55 is similar to the function of the arrangement shown in FIG. 3A of U.S. Pat. No. 4,034,411. Other referencing arrangements known in the art may also be employed.

As shown in FIG. 3, the coils 45A and 45B are provided with leads 47 which are connected to terminals on a front cover panel 43, which is attached to the generally rectangular opening 60 in the HDA. Each head-arm assembly also includes the flexible cable 42 which is attached to a printed circuit board 55 (FIG. 4B) mounted to the front panel 43 which will now be described in connection with FIG. 4A. Prior to leaving FIG. 3, it should be noted that the HDA is also provided with a narrow air inlet port 66 towards the bottom of the frame members, whose function will be described in connection with FIGS. 5 and 6 and the air flow system of the disk file.

Figures 4A, 4B:
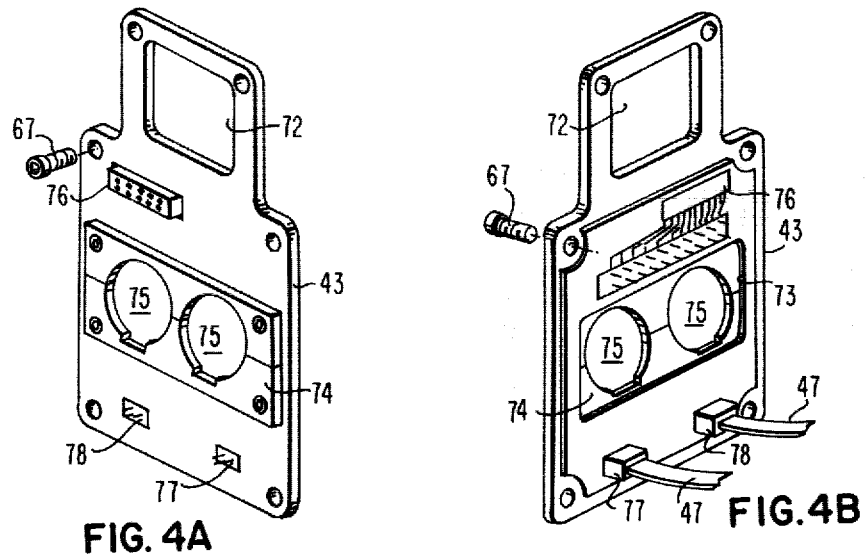
FIGS. 4A and 4B are perspective views showing the details of the front HDA cover panel.

The front panel 43 as shown in FIGS. 4A and 4B, has the same general configuration as the opening 60 into the HDA and is attached thereto by means of bolts 67. The panel 43 may be made of aluminum and is provided with two generally rectangular openings 72 and 73. Opening 72 defines an air exhaust port for the HDA and mates with suitable ducting structure on the drive assembly. Opening 73 is partially covered by a magnetic shield plate 74 which abuts the magnetic structure on the drive. The shield 74 is made in two pieces in order to position openings 75 around the extensions 44 of the coil support member attached to the carriages 37. The inside surface of the panel member 43, as shown in FIG. 4B, is provided with suitable terminal block connectors 76, 77 and 78 for attaching the cables 42 for the magnetic heads and the cables 47 of the coil, as previously described. Terminal block 76 is for signals to the transducers and blocks 77 and 78 for supplying signals to the coils from the drive. Blocks 77 and 78 mate automatically with complementary terminal block 79 on the drive when the HDA is in its operative position. Terminal block 76 is connected with a flexible cable 80 from the drive electronics.

The drive assembly characterized by the U-shaped baseplate will now be described in connection with FIG. 5.

Figure 5:
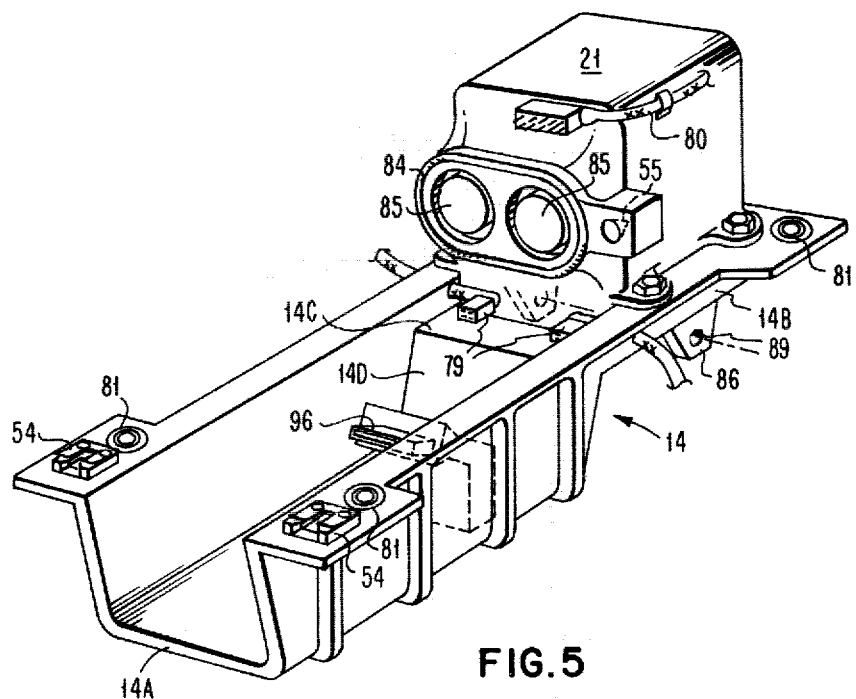
FIG. 5 is a perspective view of the U-shaped baseplate and magnet structure of the drive assembly shown in FIG. 2.

FIG. 5 illustrates primarily the details of the U-shaped baseplate 14 and the mounting of the voice coil motor structure 21. As shown, baseplate 14 has a front portion 14A having a generally U-shaped cross-section. The rear portion 14B can also have a U-shaped cross-section, but of a considerable lesser depth, so that a plate 14C is provided for the magnet structure 21. The bottom of the U-shaped front section 14A is joined to the leading edge of the platform portion 14C by the section 14D. In practice, the baseplate is cast so that all of the portions referred to above are integral, as shown in outline form in FIG. 6.

The baseplate 14 is provided with suitable shock mounts 81 which mount the baseplate to the machine frame 82. In addition, FIG. 5 illustrates in more detail the referencing means on the baseplate which cooperate with the referencing means on the HDA to properly align the two assemblies. As shown, guide blocks 54 and the reference cone block 55 provide a suitable referencing means.

The magnet structure 21 shown in FIG. 5 comprises a dual actuator voice coil motor. U.S. Pat. No. 4,136,293 (Patel), issued Jan. 23, 1979 and assigned to the assignee of the present invention, illustrates a dual actuator common magnet voice coil motor which may be employed to perform the functions of voice coil motor 21 shown in FIG. 5. Alternately, separate voice coil magnet structures may be employed to cooperate with the coils 45A and 45B of the HDA assembly. The oval shaped front edge of the magnet structure 21 is provided with a suitable gasket 84 which seals the HDA assembly 15 to this surface and allows air being exhausted from the HDA to also cool the coils 45 in the two annular flux gaps formed by center pole pieces 85.

Lastly, the baseplate is provided with a downward extending motor mount 86 on each side of the rear portion 14B of the baseplate to allow the motor for the disk spindle to be pivotally mounted with its axis parallel to the axis 25 of the disk spindle when the HDA assembly 13 is registered on the disk drive assembly. The mounting of the motor beneath the rear platform 14C of the baseplate contributes to a relatively low overall height of the disk file.

Figure 6:
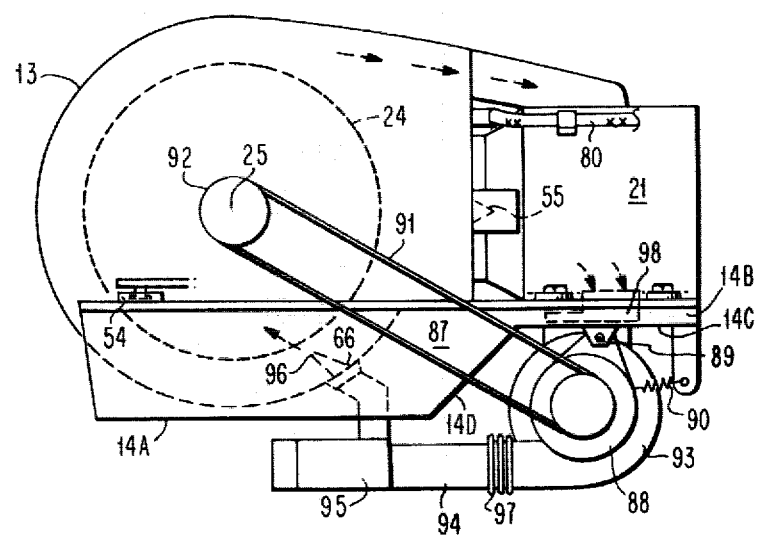
FIG. 6 is a diagrammatic side view of the disk file shown in FIG. 1 illustrating the various components of the drive assembly and the air flow path from the drive assembly through the HDA assembly.

A suitable pulley belt system 87, shown in FIG. 6, couples the disk spindle shaft to the motor shaft. The motor 88 is spring biased about its pivotal axis 89 by spring 90 to permit insertion of the belt 91 over the front pulley 92 when the HDA is being attached to the drive assembly. The spring 90 also maintains the HDA 13 through the belt system 87 biased against the reference cone 55. If additional biasing force is required for the HDA 13, any suitable external biasing arrangement known in the art may be employed.

Figure 7:
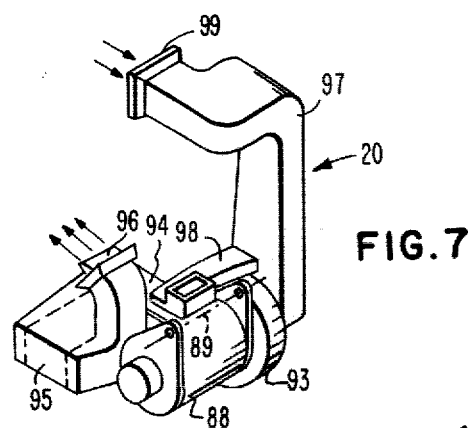
FIG. 7 is a perspective view illustrating the various components of the system for supplying contaminant free air to the HDA.

FIG. 7 also shows the system associated with the drive assembly for supplying contaminant free air to the HDA assembly and for returning air therefrom. As shown, the system, when operational, is basically a closed loop system, although an open loop system may be employed if desired. As is recognized in the art, one function of the air supply system is to maintain the disks, head-arm assemblies, baseplate, and carriages at a substantially constant temperature relative to one another. This becomes quite important where track densities are above 500 tracks to the inch and a dedicated servo surface is employed in position control of the accessing system. If different disks 24 are not subject to the same temperature, the tendency is for tracks in the same cylinder to be offset relative to each other since they experience different amounts of thermal expansion. The placement of the disks 24 in a vertical plane permits a more even exposure to the incoming air stream and provides a much more uniform temperature throughout the HDA relative to the HDA assemblies where the disks rotate in parallel horizontal planes.

The major components of the air supply system are shown in detail in FIG. 7. As shown therein, an impeller (not shown) for the blower 93 is provided with a conventional scroll shaped housing. The output of the blower 93 is connected to the air input port 66 of the HDA 13 by means of duct 94 which includes the absolute filter 95 and a suitable nozzle type member 96. Duct 94 and nozzle 96 and the absolute filter 95 may be arranged to move slightly during pivotal movement of the motor or a flexible joint 97, as shown in FIG. 6, may be employed between the fixed nozzle 96 and the movable housing 93 since the blower impeller is attached directly to the shaft of pivotal motor 88.

The remaining components of the air supply system are the two return air ducts 97 and 98. Duct 97, which can also be seen in FIG. 2, extends from the opening 72 in the HDA, defined by the cover plate 43. A suitable seal 99 is provided to seal duct 97 to the HDA. Return duct 98 extends from the bottom of the magnet structure 21 through an opening in the baseplate 14, as shown in FIG. 7, and into the side of duct 97. Duct 97 is attached to the center of the blower housing 93 by means of a bellows to accommodate movement of the casing 93 relative to the stationary duct 97 when the motor 88 is pivoted.

The absolute filter 95, shown in FIGS. 6 and 7, disposed in duct 94 between the output of the blower and the input nozzle 96, is to provide contaminant free air to the HDA.

Figure 8:
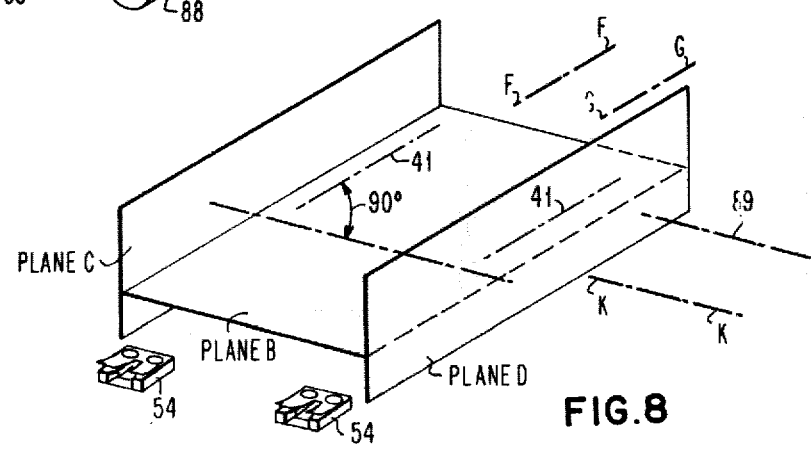
FIG. 8 is a view showing the position and alignment of several vertical axes and reference surfaces in the drive and HDA assemblies.

FIG. 8 is an illustration to show the relationship of the various axes and reference planes which exist when the HDA assembly is properly inserted in the disk drive assembly.

Axis 25 represents the disk spindle which is in a horizontal plane. The disks 24 are spaced along this axis so that their surfaces are normal to the axis 25 and perpendicular to plane B. The bearing members 26B are coaxial with axis 25 and lie in planes C and D, parallel to the disk surfaces. The round way axes 41 are parallel to each other and intersect the disk axis 25 at 90° and lie in a plane B, which is horizontal. The reference means on the drive, in cooperation with the reference means on the HDA, establish the shaft axis 25 in a horizontal plane with the pin-cone arrangement insuring that the way members are also in this horizontal plane. The yawing motion about an axis normal to the horizontal plane is controlled by the spacing between the guide blocks 54 on the baseplate 14 and the feet 50 on the HDA 13.

Axes FF and GG correspond to the axis of the annular flux gap or center pole magnets 85 and are coaxial with the axes of the associated coils 45. These axes are at the center of mass of the respective carriage assemblies 37, which tends to reduce any bending movements being introduced into the carriage assemblies 37 during rapid acceleration and deceleration periods.

Axis 89 represents the axis of the motor about which it is pivoted and axis KK represents the axis of the shaft of motor 88. These axes are parallel to the disk spindle axis 25, allowing the pulley drive belt system 87 to be positioned in a plane normal to both the spindle axis and the motor axis KK.

It will be apparent to those skilled in the art that certain modifications may be made to the preferred embodiment without departing from the spirit of the invention or from the scope of the appended claims. For example, the arrangement of the U-shaped baseplate 14 and magnet structure 21 and air supply system 20 does not necessarily depend on the magnet structure 21 having the capability of receiving a two carriage assembly HDA 13.

Also, when a two carriage HDA assembly 13 is employed, the two separate carriages 37 and the magnet structure 21 on the drive assembly, as shown, involve the coil-flux gap interface. This coil-flux gap interface could be modified in accordance with the teachings of U.S. Pat. No. 3,853,415 (Barnard et al) assigned to the assignee of the present invention. In such a modification, the coils 45 would be then permanently associated with the VCM 21 and an extension from each carriage 37 would be coupled to an extension of the coils 45, as shown in the above-mentioned patent.

Also, it will be understood that a suitable braking system could be employed to decelerate the rotating disks when power is turned off on the disk drive 10.

We claim:

1. A dual actuator disk file comprising an HDA assembly and a disk drive assembly, said HDA assembly being separable as a unit from said drive assembly and comprising at least one magnetic disk, a spindle for mounting said disk, a two part frame for mounting said spindle for rotation of said disk about an axis which is substantially horizontal and for supporting said HDA assembly in operating position on said drive assembly, first and second magnetic head transducer carriage units each of which comprises a movable carriage portion and a stationary way portion and at least one head-arm member attached to each said carriage portions, and means mounting said way portions on opposed sides of said frame to cause the respective carriage portions to move along parallel paths which are normal to the axis of said spindle and parallel to a horizontal plane containing said spindle axis and disposed on opposite sides of said at least one disk whereby the respective head-arm members are positionable independently of each other to transducing relationships with opposite surfaces of said at least one disk, said drive assembly comprising a baseplate having a U-shaped cross-section into which a portion of said HDA assembly below said horizontal plane is positioned when said HDA is in operating position on said drive assembly, voice coil magnet means mounted on said baseplate including magnet structure defining first and second annular flux gaps, and first and second voice coils permanently associated with said first and second carriage units for causing movement of said carriage portions independently of each other in response to separate signals supplied to said respective voice coils.

2. The disk file of claim 1 in which each said movable carriage has an L-shaped profile, the base portion of said L-shaped profile adjacent the way portion causing the center of mass of said carriage unit to be offset towards said way member relative to the mid point of the upright portion of said L-shaped profile and in which the axis of said coils intersects said centers of mass of said respective carriage units.

* * * * *